F. A. NOLAN.

SHOE HEEL.

APPLICATION FILED JULY 20, 1914.

Reissued Dec. 1, 1914. 13,840.

Witnesses

C. Davis

A. S. Swanson.

Inventor

Francis A. Nolan

By Lothrop & Johnson his Attorneys.

UNITED STATES PATENT OFFICE.

FRANCIS A. NOLAN, OF ST. PAUL, MINNESOTA.

SHOE-HEEL.

13,840. Specification of Reissued Letters Patent. Reissued Dec. 1, 1914.

Original No. 1,096,008, dated May 5, 1914, Serial No. 760,581. Application for reissue filed July 20, 1914. Serial No. 852,091.

*To all whom it may concern:*

Be it known that I, FRANCIS A. NOLAN, a citizen of the United States, residing at St. Paul, in the county of Ramsey and State of Minnesota, have invented certain new and useful Improvements in Shoe-Heels, of which the following is a specification.

My invention consists particularly in improvements in that class of detachable heels in which a supporting fastener is secured upon a shoe, in combination with a detachable heel of rubber or other resilient material so constructed and related to said fastener as to be easily mounted upon or removed therefrom.

Among the objects of my invention is to provide improved means for anchoring the detachable heel upon a shoe against lateral displacement; and to assist in the ease of securing the heel in position.

A further object of my construction is the hermetic sealing characteristics of the heel.

More particularly this invention is an improvement on the construction set forth in Patent No. 1,004,897, granted to me on October 3, 1911, for heel fasteners.

Further advantages attained by my invention will be pointed out in the following description.

Figure 5:
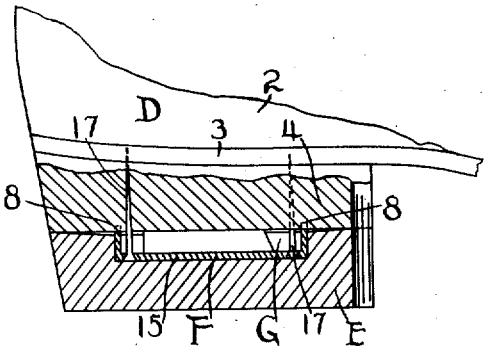
Figure 2:
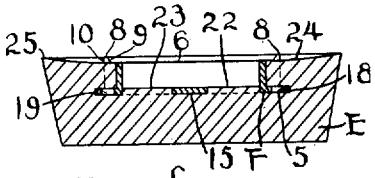
Figure 4:
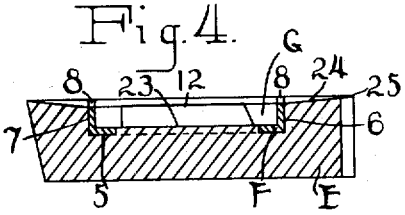
Figure 1:
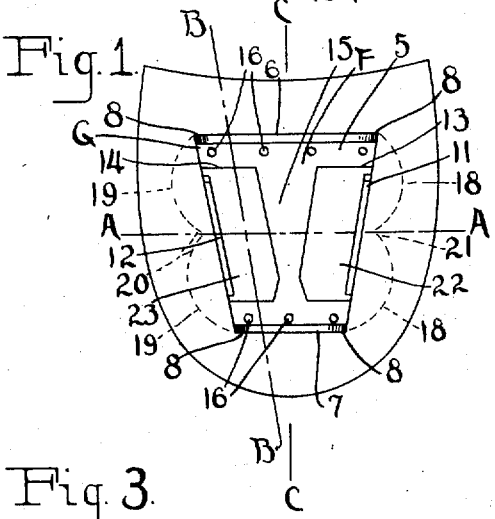
Figure 6:
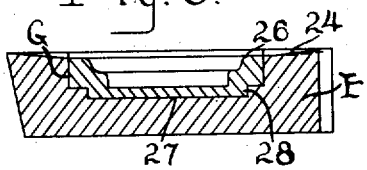
Figure 3:
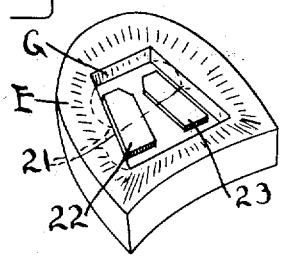
Figure 7:
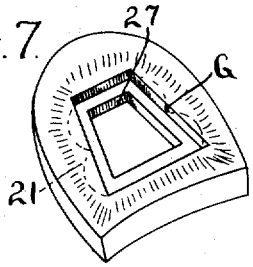

In the accompanying drawing forming part of this specification, Figure 1 is a plan looking down upon my improved resilient heel with my improved fastener in place therein; Fig. 2 is a section taken upon the line A—A of Fig. 1; Fig. 3 is a perspective view of my improved heel with the fastener removed; Fig. 4 is a section taken upon the line B—B of Fig. 1; Fig. 5 is a detail of a shoe partly in section showing my improved heel and fastener mounted thereon, said heel and fastener being illustrated in section upon the line C—C of Fig. 1; Fig. 6 is a longitudinal central section of an alternative construction of my invention; and Fig. 7 is a perspective view of the heel illustrated in Fig. 6 with the fastener removed.

In the drawings is illustrated a portion of a shoe D having a counter 2, sole 3, and a heel base 4, which may be of any desired thickness or may be omitted entirely. A heel E formed of rubber or other suitable resilient material is adapted to be attached to the shoe by a fastener F for which the heel E is suitably recessed at G. The fastener F as shown is in the form of a plate 5 punched from a flat piece of sheet metal having front and rear rim portions 6 and 7 which are adapted to be bent upwardly at right angles to the plane of the plate. At the corners of the upturned portions are points 8 which extend upward in the completed form of the device as shown in Fig. 2, each point having one face 9 oblique and one face 10 normal to the surface of the heel base. From the sides of the plate 5 rim portions 11 and 12 extend upwardly at right angles to the plane of the plate. The plate is formed with spaced openings 13 and 14, constituting a bridge 15 connecting the front and rear ends of the plate for reinforcing purposes. Holes 16 are punched in the plate 5 through which nails 17, screws or other suitable means of attachment to the shoe may be passed. The rim portions 6, 7, 11, and 12 are of substantially the same height above the plate, forming a rim which is adapted to rest against the lower surface of the heel base 4 of the shoe.

Flanges 18 and 19 as shown project outwardly from opposite sides of the plate 5 and in alinement therewith. Each flange is formed with a curved outer edge cut inward centrally at 20. With the fastener in position against the lowest surface of the heel base of the shoe the nails 17 are driven through the holes 16 and heel base to attach the fastener firmly to the shoe. The points 8 are forced into the leather of the heel base 4 and assist in taking the lateral strain from the nails 17.

The heel E has the usual outer design which together with the heel base 4 make up a heel of the proper height for a shoe. In the top of the heel is a cavity G fitted to the exterior of the rim formed by the rim portions 6, 7, 11 and 12 and fitting snugly over them when the heel E is in its proper position on the shoe. Below the top of the heel the cavity G is recessed laterally to receive the flanges 18 and 19, the resilient material on each side being left in the form of a web 21 to fill the central incut portion of the adjacent flange. The flanges 18 and 19 being of the same form on the two sides of the fastener, the recesses in the resilient heel E are of the same form on the two sides of the heel, allowing the heel to be put on from either side equally well, and also permitting heels on a pair of shoes being interchanged to produce even wear and longer life. The bottom of the cavity G in the rubber heel is formed with protuberances 22 and 23 equalizing in height the thickness of the plate 5. These protuberances are similar in shape to the spaces or openings 13 and 14 in the plate and serve to strengthen the engagement between the resilient heel and the fastener and prevent all longitudinal and lateral movement between said parts. Thus the heel on its mounting is strengthened materially over a construction wherein protuberances of the character set forth are not provided.

The upper surface 24 of the heel is concave, its marginal edge 25 around the entire heel lying in a single plane. This concavity causes the marginal edge to lie in the same plane with the extremities of the points 8 (with the heel and fastener secured together and unsecured to the shoe) thus enabling the heel E to be placed upon the portion 4 to mark the position of the fastener. When so positioned a sharp impact against the lower surface of the detachable heel causes the points 8 to indent the lower surface of the heel base 4. After marking the position of the fastener on the heel base, the fastener is removed from the detachable heel and secured in position according to said indentations on the heel base, by the nails 17 and points 8, and the detachable heel is then sprung into position on the fastener. The detachable heel is thus adapted to be secured in place under tension or compression causing a firmer hold by suction upon the heel base and forming a tighter joint between it and the base. This is obviously an advantage because the mounting is stronger and the joint neater in appearance, not allowing any moisture or foreign matter to creep into the cavity G.

In the alternative construction the fastener 26 is of substantially the same design as the preferred, excepting that it is made out of cast material instead of being stamped from a plate. The protuberances instead of being formed in the detachable heel are of single form produced on the lower surface of the fastener 26 and the heel formed with a space or depression 27, the margin of which fits snugly over the margin of the protuberance 28 on the fastener.

In accordance with the patent statutes I have described the principles of operation of my invention together with the apparatus which I now consider to represent the best embodiment thereof, but I desire to have it understood that the construction shown is only illustrative and may be modified without departing from my invention, the scope of which is set forth in the following claims.

I claim as my invention:

1. In combination a fastener for a resilient shoe heel comprising a body having a rim portion to space it from the heel of the shoe and a flange projecting outwardly from said body, in combination with a recessed resilient heel arranged to be sprung over said body and flange to engage with the same, one of said parts having a protuberance and the other an opening in which said protuberance is arranged to engage to assist in preventing lateral displacement of said heel from said body fastener.

2. A rubber heel and its fastening means comprising a metal plate adapted to be permanently secured upon the heel portion of a shoe, indenting points projecting from the shoe abutting side of the plate, and a resilient heel having its shoe abutting face concaved and formed with a central opening to receive said fastener with the indenting points of the fastener projecting beyond the concavity of said heel when fitted in said opening.

3. In combination a resilient heel and means for supporting the same upon a shoe, comprising a fastener adapted to be permanently secured to the heel portion of a shoe and formed with indenting points projecting from its shoe abutting side, and a resilient heel having its entire shoe abutting face concaved and formed with a central opening to receive said fastener, said opening being so proportioned to said fastener as to leave said indenting points projecting from the adjacent face of the heel when said fastener is fitted in said opening, for the purpose set forth.

4. In combination a resilient heel and means for securing the same to the heel portion of a shoe comprising a fastener consisting of a plate and a rim portion to hold said plate spaced from the heel of the shoe, said fastener being formed with indenting points upon its shoe abutting side, said points projecting beyond the rim portion, and a heel having its shoe abutting face concaved to leave a relatively projecting outer edge, said heel being formed with a central opening to receive said fastener with said indenting points projecting beyond the adjacent face of the resilient heel, so that when said points are pressed into the shoe portion said resilient heel will be drawn down against said shoe portion to hermetically seal the joint between the outer edge of the resilient heel and shoe portion.

In testimony whereof, I have hereunto set my hand this 11th day of June, 1914.

FRANCIS A. NOLAN.

Witnesses:
H. S. JOHNSON,
H. SWANSON.